United States Patent
Zheng

(10) Patent No.: US 8,936,665 B2
(45) Date of Patent: Jan. 20, 2015

(54) DIAMOND METAL COMPOSITE

(75) Inventor: Jie Zheng, Solna (SE)

(73) Assignee: Alfa Laval Corporate AB, Lund (SE)

(*) Notice: Subject to any disclaimer, the term of this patent is extended or adjusted under 35 U.S.C. 154(b) by 223 days.

(21) Appl. No.: 12/741,318

(22) PCT Filed: Oct. 30, 2008

(86) PCT No.: PCT/SE2008/051235
§ 371 (c)(1),
(2), (4) Date: May 25, 2010

(87) PCT Pub. No.: WO2009/061265
PCT Pub. Date: May 14, 2009

(65) Prior Publication Data
US 2010/0279138 A1 Nov. 4, 2010

(30) Foreign Application Priority Data
Nov. 8, 2007 (SE) ...................................... 0702474

(51) Int. Cl.
*C22C 26/00* (2006.01)
*B01J 3/06* (2006.01)
*C09K 3/14* (2006.01)
*C22C 47/08* (2006.01)

(52) U.S. Cl.
CPC .............. *B01J 3/065* (2013.01); *C09K 3/1436* (2013.01); *C22C 47/08* (2013.01); *B01J 2203/062* (2013.01); *B01J 2203/0655* (2013.01); *B22F 2999/00* (2013.01)
USPC ................... 75/243; 419/11; 419/27; 419/38; 51/307; 175/434; 428/551

(58) Field of Classification Search
USPC ..................... 75/243; 419/11, 27, 38; 51/307; 175/434
See application file for complete search history.

(56) References Cited

U.S. PATENT DOCUMENTS

| 3,316,073 A | | 4/1967 | Kelso |
| 4,024,675 A | | 5/1977 | Naidich |
| 4,231,195 A | | 11/1980 | DeVries et al. |
| 4,242,106 A | | 12/1980 | Morelock |
| 4,246,006 A | | 1/1981 | Phaal |
| 4,373,934 A | | 2/1983 | Hayden |
| 5,096,465 A | | 3/1992 | Chen |
| 5,116,568 A | | 5/1992 | Sung |
| 5,505,750 A | * | 4/1996 | Andrews .......................... 51/309 |
| 5,783,316 A | | 7/1998 | Colella et al. |
| 6,031,285 A | | 2/2000 | Nishibayashi |
| 6,039,641 A | | 3/2000 | Sung |
| 6,171,691 B1 | | 1/2001 | Nishibayashi |
| 6,372,012 B1 | * | 4/2002 | Majagi et al. ................... 75/236 |
| 6,447,852 B1 | | 9/2002 | Gordeev |
| 6,562,288 B2 | * | 5/2003 | Park .................................. 419/8 |
| 7,279,023 B2 | * | 10/2007 | Pickard et al. .................. 75/243 |
| 2006/0157884 A1 | * | 7/2006 | Ludtke et al. ................. 264/122 |

FOREIGN PATENT DOCUMENTS

| GB | 1382080 A | 1/1975 |
| GB | 2006733 A | 5/1979 |

OTHER PUBLICATIONS

PCT International Search Report; International Application No. PCT/SE2008/051235; Date Filed October 30, 2008.

* cited by examiner

*Primary Examiner* — George Wyszomierski
*Assistant Examiner* — Ngoclan T Mai
(74) *Attorney, Agent, or Firm* — MKG, LLC

(57) ABSTRACT

The present invention relates to a method for producing diamond-metal composites comprising mixing diamond particles with metal-filler particles forming a diamond/metal-filler mixture, forming a green body of the diamond/metal-filler mixture, optionally green machining the green body to a work piece before or after pre-sintering by heating the green body to a temperature ≤500° C., infiltrating the green body or the work piece with one or more wetting elements or infiltrating the green body or the work piece with one or more wetting alloys, which infiltration step being carried out under vacuum or in an inert gas atmosphere at a pressure ≤200 Bar. The invention relates further to a green body, a diamond metal composite, and use of the diamond metal composite.

24 Claims, No Drawings

DIAMOND METAL COMPOSITE

FIELD OF THE INVENTION

The present invention relates to a method of manufacturing a diamond metal composite, a green body, a diamond metal composite, and uses of the diamond metal composite.

BACKGROUND

In many applications there are needs for materials having special properties, since the environment in which the materials are used could be abrasive, corrosive, erosive etc. Many of the materials used for the mentioned applications are manufacture under pressure and at high temperatures. Other materials are produced by complicated manufacturing methods, which include coating of particles. Some materials are produced by brazing.

One problem when producing a diamond composite is that diamonds are unreactive and do not easily form bonds to other elements. On the other hand, diamond is thermodynamically unstable at high temperature, and tends to convert to graphite. With increasing pressure, the stable area of diamond expands to higher temperature. This is a reason why most of the diamond composites existing today are made by process under high temperature and under high pressure. Another problem is high cost or the complicated manufacturing methods.

Yet another problem with the high-temperature- and high-pressure processes is that the process can only produce products having simple geometry, like discs or plates. Another problem with these processes is the size limitation, which means that it is not possible to produce products of larger size.

Another problem of a diamond composite is that diamond has low brazing ability. This limits the application of the composite, in which brazing of diamond is necessary on other material surface.

SUMMARY

The present invention solves the above-mentioned technical problems by the new method and the new material. Accordingly the present invention provides a new method for producing diamond metal composites, which method comprises mixing diamond particles with metal-filler particles forming a diamond/metal-filler mixture, forming a green body of the diamond/metal-filler mixture, optionally green machining the green body to a work piece before or after pre-sintering by heating the green body to a temperature ≤500° C., infiltrating the green body or the work piece with one or more wetting elements or infiltrating the green body or the work piece with one or more wetting alloys, which infiltration step being carried out under vacuum or in an inert gas atmosphere at a pressure ≤200 Bar.

DETAILED DESCRIPTION

The above-described method of the invention gives the possibility to design the produced diamond composite and to produce a composite having the desired properties of a specific application. In general, with increasing content of the metal filler, the density, thermal expansion, fracture toughness and brazing ability will increase, but the hardness and Young's modulus decrease. The higher content of metal filler introduced into the materials, the wider range of the properties can be adjusted of the materials. Therefore, the method according to the invention comprises mixing metal filler particles (Me) in an amount less than 100 percent by weight (wt %) with diamond particles (D) in an amount D=100 wt %−Me forming a green body.

The filler particles are selected from one or more elements or one or more alloys of the elements from the group consisting of titanium (Ti), zirconium (Zr), hafnium (Hf), vanadium (V), niobium (Nb), tantalum (Ta), chromium (Cr), molybdenum (Mo), tungsten (W), technetium (Tc), rhenium (Re), iron (Fe), cobalt (Co), nickel (Ni), and silicon (Si). According to one alternative may the filler particles be selected from one or more elements or alloys of one or more elements of the group consisting of Ti, Cr, Mo, W and Co.

According to one alternative of the invention may 0.1 to 55 wt % of metal filler particles be mixed with 45 to 99.9 wt % of diamond particles. According to another alternative may 0.5 to 50 wt % of metal filler particles be mixed with 50 to 99.5 wt % of diamond particles. 0.1 to 45 wt % of metal filler particles be mixed with 55 to 99.9 wt % of diamond particles. According to another alternative may 0.5 to 30 wt % of metal filler particles be mixed with 70 to 99.5 wt % of diamond particles. According to a further alternative may 1.0 to 30 wt % of metal filler particles be mixed with 70 to 99 wt % of diamond particles.

The method comprises that the diamond/filler mixture is mixed with a binder to stabilise the shape of the green body before pre-sintering. The binder could be polymers, resin, cellulose, starch, etc. In the method of the invention, the maximal amount of binder is less than 50% by volume for a porosity of less than 50 vol %. In principle, the amount of binder should be as small as possible if the formed green body is strong enough. The amount needed is dependent on what kind of binder is used, particle size and product design. According to one alternative of the invention the amount of binder may be ≤10 percent by weight (wt %). But in some cases, such as in powder injection moulding it may be ≤20 percent by weight (wt %) of binders. In the following green body is defined as the body formed of the diamond/filler mixture with or without addition of a binder, and work piece is defined as the product of the green machined green body.

According to one alternative the method may include spray drying the diamond/filler/binder mixture into granules, and then forming the granules into a green body by pressing. According to another alternative the method may include forming the diamond/filler/binder mixture into a green body by one of the processes in the group consisting of casting, injection moulding, roll compaction, and extrusion.

A green machining of the green body before and/or after pre-sintering can be performed by traditional ways, such as cutting, sawing, drilling, milling, and turning etc. This step can effectively minimise or avoid the final machining on a hard body.

In the method according to the invention the pre-sintering is carried out at a temperature less or equal to 500° C. in the air, an inert gas atmosphere or in vacuum. According to one alternative of the invention the pre-sintering temperature may be less or equal to 450° C. According to one alternative of the invention the pre-sintering temperature may be less or equal to 300° C.

The green body or work piece is sintered or bonded together at a temperature less than 1750° C. under vacuum by infiltrating wetting elements or wetting alloys into the green body or work piece. According to one alternative the sintering temperature may be less than 1700° C. The method according to the present invention includes also that the bonding or sintering is carried out by infiltration in an inert gas atmosphere at a pressure less than or equal to 200 Bar at a temperature less than 1700° C. According to another method, the infiltration may be carried out at a pressure less or equal to 100 Bar. The inert atmosphere could be comprised of argon, nitrogen, hydrogen or mixtures thereof.

The infiltrating materials, which could be one or more wetting elements or the infiltrating materials could be one or more alloys of one or more wetting elements. It is important that the wetting angle of the wetting material on the work piece is <90°. According to another alternative, the wetting angle is small could be ≤45°.

In the sintering step of the method of the invention the amount of wetting materials, which are used for infiltrating the work piece may be at least 5 wt % more than the theoretical amount, which secures a complete infiltration of the work piece.

The infiltrating materials of the invention could be wetting elements, which could be one or more elements selected from the group consisting of manganese (Mn), titanium (Ti), chromium (Cr), molybdenum (Mo), tungsten (W), iron (Fe), cobalt (Co), nickel (Ni), copper (Cu), silver (Ag), gold (Au), aluminium (Al), and silicon (Si). According to one alternative the wetting elements may be selected from one or more elements of the group consisting of Ti, Mn, Cr, Cu and Si.

According to one alternative of the invention the infiltrating materials could be wetting alloys. The wetting alloys could be alloys of two or more elements selected from the group consisting of manganese (Mn), titanium (Ti), chromium (Cr), molybdenum (Mo), tungsten (W), iron (Fe), cobalt (Co), nickel (Ni), copper (Cu), silver (Ag), gold (Au), aluminium (Al), and silicon (Si). According to one alternative the wetting alloys may be selected from two or more elements of the group consisting of Ti, Mn, Cr, Cu and Si.

According to one alternative of the invention may the wetting elements or the wetting alloys have a liquidus temperature of less than or equal to 1500° C. According to another alternative the wetting elements or the wetting alloys may have a liquidus temperature of less than or equal to 1450° C. According to another alternative the wetting elements or the wetting alloys may have a liquidus temperature of less than or equal to 1400° C.

The present invention relates further to a green body, which comprises diamonds and filler material. Optionally the green body may contain a binding material. The filler materials being one or more elements or one or more alloys of the elements from the group consisting of titanium (Ti), zirconium (Zr), hafnium (Hf), vanadium (V), niobium (Nb), tantalum (Ta), chromium (Cr), molybdenum (Mo), tungsten (W), technetium (Tc), rhenium (Re), iron (Fe), cobalt (Co), nickel (Ni), and silicon (Si). According to one alternative the filler materials may be selected from one or more elements or alloys of one or more elements of the group consisting of Ti, Cr, Mo, W and Co.

The green body according to the invention can have an amount of metal filler particles (Me) in an amount less than 100 percent by weight (wt %) and the amount of diamond particles is (D) in an amount D=100 wt %−Me. According to one alternative of the invention the amount of filler particles may be within the range 0.1 to 55 wt % and the amount of diamond particles is within the range 45 to 99.9 wt %. According to another alternative the amount of filler particles may be within the range 0.5 to 50 wt % and the amount of diamond particles is within the range 50 to 99.5 wt %. According to a further alternative the amount of filler particles may be within the range 1.0 to 45 wt % and the amount of diamond particles is within the range 55 to 99 wt %. Optionally the mixture of metal filler particles and diamond particles also may comprise a binding material. The binder could be polymers, resin, cellulose, starch, etc. The amount of binder is ≤50% by volume for a porosity of ≤50 vol %, or the amount of binder should be as small as possible. The amount of binder may be ≤10 percent by weight (wt %).

The present invention relates further to a diamond composite, which comprises diamonds, filler material and wetting materials, and/or reaction products between diamond, metal filler and wetting elements. The filler materials being one or more elements or one or more alloys of the elements from the group consisting of titanium (Ti), zirconium (Zr), hafnium (Hf), vanadium (V), niobium (Nb), tantalum (Ta), chromium (Cr), molybdenum (Mo), tungsten (W), technetium (Tc), rhenium (Re), iron (Fe), cobalt (Co), nickel (Ni), and silicon (Si). According to one alternative the filler materials may be selected from one or more elements or alloys of one or more elements of the group consisting of Ti, Cr, Mo, W and Co. The wetting materials being wetting one or more elements selected from the group consisting of manganese (Mn), titanium (Ti), chromium (Cr), molybdenum (Mo), tungsten (W), iron (Fe), cobalt (Co), nickel (Ni), copper (Cu), silver (Ag), gold (Au), aluminium (Al), and silicon (Si). According to one alternative the wetting elements may be selected from one or more elements of the group consisting of Ti, Mn, Cr, Cu and Si.

According to one alternative of the invention the wetting materials may be wetting alloys. The wetting alloys could be alloys of two or more elements selected from the group consisting of manganese (Mn), titanium (Ti), chromium (Cr), molybdenum (Mo), tungsten (W), iron (Fe), cobalt (Co), nickel (Ni), copper (Cu), silver (Ag), gold (Au), aluminium (Al), and silicon (Si). According to one alternative the wetting alloys may be selected from two or more elements of the group consisting of Ti, Mn, Cr, Cu and Si.

The present invention relates further to products obtained by the method of the invention. The present invention relates further to uses of the diamond composite as a hard and/or abrasive material. Yet another alternative of the present invention is the use of the diamond metal composite as a material in nozzles, sleeves, tiles, tubes or plates, cutting tools, drilling bits or mining inserts. Yet another alternative may the nozzles, sleeves, tiles, tubes or plates be used in places where there is wear. Yet another alternative may the nozzles be used in high-speed centrifuges.

Further embodiments of the invention are defined in the claims. The invention is explained in more detail in by means the following Examples. The purpose of the Examples is to test the diamond composite of the invention, and is not intended to limit the scope of invention.

Example 1

Preparation of Diamond/Chromium Composites

To indicate wide content of metal filler can be introduced into the material, a series of diamond/chromium composites were prepared. Diamond powder with a particle size range 5-30 µm was mixed with Cr powder in different weight ratio. Resin used as pressing binder, and details are listed in Table 1. The powder mixtures were stirred in an ethanol solution, and then dried in the air.

Discs with 18 mm diameter and 2-3 mm thickness were formed by die pressing, with a pressing force of 65 kN for 10 sec. The green bodies were slowly heated up to 160° C. for 1 hour. Sintering was performed in vacuum by Si infiltration at 1565° C. for 6 min density of different samples is given in Table 1.

TABLE 1

| Cr (wt. %) | 2 | 8 | 15 | 20 | 25 | 45 |
|---|---|---|---|---|---|---|
| Binder (wt. %) | 5 | 4.5 | 4 | 3.7 | 3.4 | 3.2 |
| Density (g/cm$^3$) | 3.34 | 3.36 | 3.36 | 3.41 | 3.44 | 3.67 |

The Table 1 shows that with increasing amounts of Cr-filler the density of the composite is also increasing. It can be expected the thermal expansion, fracture toughness and brazing ability will be also increased. This shows the possibility to design the composite to a desired application.

Example 2

Preparation of Metal/Diamond Composites

W and Mo were mixed with diamond powder (particle size 5-10 nm), respectively. The metal/diamond weight ration was 90:10. Forming of discs which were heat-treated the same way as in Example 1. Sintering was performed in a graphite furnace. The samples were heated at 470° C. for 10 min, and then 700° C. for 30 min in a $N_2+4\%$ $H_2$ atmosphere. The infiltration with Cu was carried out in vacuum at 1280° C. for 30 min. The density of W/diamond and Mo/diamond were 9.27 and 7.85 g/cm$^3$, respectively. The results show that the selected filler element also has an influence on the property, such as the density.

Example 3

Preparation of Diamond/Metal Composites

Six different diamond/metal composites were prepared by similar way as in Example 1. The diamond/metal weight ration was 92:8. The density of different samples is given in Table 2.

TABLE 2

| | Metal | | | | | |
|---|---|---|---|---|---|---|
| | Ti | Cr | Mo | W | Co | Cr + Mo |
| Metal (wt. %) | 8 | 8 | 8 | 8 | 8 | 4 + 4 |
| Density (g/cm$^3$) | 3.27 | 3.36 | 3.43 | 3.46 | 3.32 | 3.40 |

The results in Table 2 show that with the same amount of metal filler it will give different density of the composites, which depends on the type of the metal filler or the combination of the metal fillers.

The invention claimed is:

1. A method for producing diamond-metal composites comprising mixing diamond particles with metal-filler particles forming a diamond/metal-filler mixture, forming a green body of the diamond/metal-filler mixture, pre-sintering by heating the green body to a temperature ≤500° C., infiltrating the green body with at least one of one or more wetting elements and one more wetting alloys, which infiltration step being carried out under vacuum or in an inert gas atmosphere at a pressure ≤200 Bar, wherein the wetting elements or the wetting alloys has a wetting angle <90° on the work piece or on the green body.

2. The method according to claim 1, wherein the method also includes mixing the diamond/metal-filler mixture with a binder forming a diamond/filler/binder mixture.

3. The method according to claim 2, wherein the binder being polymers, resin, cellulose, or starch, and wherein the binder being added to the diamond-metal-filler mixture in an amount less than 50 wt %.

4. The method according to claim 2, wherein the binder being added to the diamond/metal-filler mixture in an amount less than 20 wt %.

5. The method according to claim 2, wherein the method also includes spray drying the diamond/filler/binder mixture into granules, and forming the granules into a green body by pressing.

6. The method according to claim 2, wherein the method also includes forming the diamond/filler/binder mixture into a green body by one of the processes selected from the group consisting of casting, injection moulding, roll compaction and extrusion.

7. The method according to claim 1, wherein the green machining being cutting, sawing, drilling, milling, or turning.

8. The method according to claim 1, wherein the method includes pre-sintering of the green body or of the work piece at a temperature less or equal to 500° C. in the air, an inert gas atmosphere or in vacuum.

9. The method according to claim 1, wherein the method includes infiltration of the wetting elements or the wetting alloys into the green body or the work piece at a temperature ≤1750° C. under vacuum.

10. The method according to claim 1, wherein the method includes infiltration of the wetting elements or the wetting alloys into the green body or the work piece at a temperature ≤1700° C.

11. The method according to claim 1, wherein the filler particles are selected from one or more elements or one or more alloys of the elements from the group consisting of Ti, Zr, Hf, V, Nb, Ta, Cr, Mo, W, Tc, Re, Fe, Co, Ni, and Si.

12. The method according to claim 1, wherein the wetting elements or the wetting alloys being selected from one or more elements of the group consisting of Mn, Cr, Mo, W, Fe, Co, Ni, Cu, Ag, Au, Al, and Si.

13. The method according to claim 1, wherein the wetting metals or the wetting metal alloys having a liquidus temperature of ≤1500° C.

14. The method according to claim 1 further comprising machining the green body before or after pre-sintering.

15. A method for producing diamond-metal composites comprising mixing diamond particles with metal-filler particles forming a diamond/metal-filler mixture, forming a green body of the diamond/metal-filler mixture, pre-sintering by heating the green body to a temperature ≤500° C., infiltrating the green body with at least one of one or more wetting elements and one more wetting alloys, which infiltration step being carried out under vacuum or in an inert gas atmosphere at a pressure ≤200 Bar wherein the method further comprises machining the green body before or after pre-sintering, and wherein the wetting metals or the wetting metal alloys having a liquidus temperature of ≤1500° C.

16. A diamond metal composite body containing diamond particles, metal filler particles, one or more wetting elements or one or more wetting alloys, and reaction products between diamond, metal filler and wetting elements, wherein the metal filler particles are selected from one or more elements or alloys of one or more elements of the group consisting of Ti, Cr and Mo.

17. A diamond metal composite body containing diamond particles, metal filler particles, one or more wetting elements or one or more wetting alloys, and reaction products between diamond, metal filler and wetting elements, wherein the wetting elements or the wetting alloys being selected from one or more elements of the group consisting of Mn and Cr.

18. The diamond metal composite according to claim 16, for production of nozzles, sleeves, tiles, tubes or plates, cutting tools, drilling bits or mining inserts.

19. The diamond metal composite according to claim 17, for production of nozzles, sleeves, tiles, tubes or plates, cutting tools, drilling bits or mining inserts.

20. A diamond metal composite body containing diamond particles, metal filler particles, one or more wetting elements or one or more wetting alloys, and reaction products between diamond, metal filler and wetting elements, wherein the metal filler particles are selected from one or more elements or alloys of one or more elements of the group consisting of Ti, Cr, Mo, W and Co; and the one or more wetting elements or one or more wetting alloys has a wetting angle of <90 degrees.

21. A diamond metal composite body containing diamond particles, metal filler particles, one or more wetting elements or one or more wetting alloys, and reaction products between diamond, metal filler and wetting elements, wherein the metal filler particles are selected from one or more elements or alloys of one or more elements of the group consisting of Ti, Cr, Mo, W and Co; and 3.2 to 5 wt % of a binder.

22. A diamond metal composite body containing diamond particles, metal filler particles, one or more wetting elements or one or more wetting alloys, and reaction products between diamond, metal filler and wetting elements, wherein the wetting elements or the wetting alloys being selected from one or more elements of the group consisting of Mn, Cr, Cu and Si; and the one or more wetting elements or one or more wetting alloys has a wetting angle of <90 degrees.

23. A diamond metal composite body containing diamond particles, metal filler particles, one or more wetting elements or one or more wetting alloys, and reaction products between diamond, metal filler and wetting elements, wherein the wetting elements or the wetting alloys being selected from one or more elements of the group consisting of Mn, Cr, Cu and Si; and 3.2 to 5 wt % of a binder.

24. A diamond metal composite body, containing diamond particles, metal filler particles, one or more wetting elements or one or more wetting alloys, and reaction products between diamond, metal filler and wetting elements, obtained by mixing the diamond particles with the metal-filler particles forming a diamond/metal-filler mixture, forming a green body of the diamond/metal-filler mixture and machining the green body before or after pre-sintering, wherein the green machining being cutting, sawing, drilling, milling, or turning, pre-sintering by heating the green body to a temperature <500° C., infiltrating the green body or the work piece with one or more wetting elements or infiltrating the green body or the work piece with one or more wetting alloys, which infiltration step being carried out under vacuum or in an inert gas atmosphere at a pressure <200 Bar;

wherein the green body also contains a binder, which binder being polymers, resin, cellulose, or starch, and the amount of the binder being 3.2 to 5 wt %.

* * * * *